(12) United States Patent
Kim et al.

(10) Patent No.: US 9,309,112 B2
(45) Date of Patent: Apr. 12, 2016

(54) RECHARGEABLE LITHIUM BATTERY INCLUDING NEGATIVE ACTIVE MATERIAL

(75) Inventors: Jae-Myung Kim, Yongin-si (KR); Kyu-Nam Joo, Yongin-si (KR); Tae-Sik Kim, Yongin-si (KR); Deok-Hyun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 852 days.

(21) Appl. No.: 13/136,723

(22) Filed: Aug. 8, 2011

(65) Prior Publication Data
US 2012/0141872 A1 Jun. 7, 2012

(30) Foreign Application Priority Data
Dec. 1, 2010 (KR) .................. 10-2010-0121531

(51) Int. Cl.
*H01M 4/58* (2010.01)
*B82Y 30/00* (2011.01)
*H01M 4/134* (2010.01)
*H01M 4/36* (2006.01)
*H01M 4/38* (2006.01)
*H01M 4/48* (2010.01)

(52) U.S. Cl.
CPC ............... *B82Y 30/00* (2013.01); *H01M 4/134* (2013.01); *H01M 4/366* (2013.01); *H01M 4/38* (2013.01); *H01M 4/483* (2013.01); *Y02E 60/122* (2013.01); *Y02P 70/54* (2015.11)

(58) Field of Classification Search
CPC ....... H01M 4/134; H01M 4/366; H01M 4/38; H01M 4/483
See application file for complete search history.

(56) References Cited

U.S. PATENT DOCUMENTS

| 7,037,581 B2 | 5/2006 | Aramata et al. |
| 2009/0004564 A1 | 1/2009 | Ishida et al. |

FOREIGN PATENT DOCUMENTS

| JP | 2002-042806 A | 2/2002 |
| JP | 3952180 B2 | 5/2007 |
| KR | 10-2007-0088534 A | 8/2007 |
| KR | 10-2010-0060613 A | 6/2010 |

OTHER PUBLICATIONS

Machine English Translation of JP 2002-042806 A.

*Primary Examiner* — Helen O Conley
(74) *Attorney, Agent, or Firm* — Lewis Roca Rothgerber Christie LLP

(57) ABSTRACT

A rechargeable lithium battery that includes a negative electrode including a silicon-based negative active material; a positive electrode including a positive active material being capable of intercalating and deintercalating lithium; and a non-aqueous electrolyte, wherein the silicon-based negative active material includes a $SiO_x$ ($0<x<2$) core including Si grains and a continuous or discontinuous coating layer including Ag, the coating layer being disposed on the core.

12 Claims, 10 Drawing Sheets

(X5000, 10% Ag)

(X5000, 20% Ag)

(X5000, 50% Ag)

RECHARGEABLE LITHIUM BATTERY INCLUDING NEGATIVE ACTIVE MATERIAL

CROSS-REFERENCE TO RELATED APPLICATION

This application claims priority to and the benefit of Korean Patent Application No. 10-2010-0121531, filed in the Korean Intellectual Property Office on Dec. 1, 2010, the entire content of which is incorporated herein by reference.

BACKGROUND

1. Field

This disclosure relates to a rechargeable lithium battery including a negative active material.

2. Description of the Related Art

Lithium rechargeable batteries have recently drawn attention as a power source for small portable electronic devices. They use an organic electrolyte solution to thereby have discharge voltage that is twice higher than that of a conventional battery using an alkali aqueous solution, and accordingly, the lithium rechargeable batteries have high energy density.

As for positive active materials of a rechargeable lithium battery, there has been research on a lithium-transition element composite oxide that can intercalate lithium such as $LiCoO_2$, $LiMn_2O_4$, $LiNi_{1-x}Co_xO_2$ (0<x<1), etc.

On the other hand, negative active materials of a rechargeable lithium battery have included various carbon-based materials such as artificial graphite, natural graphite, and hard carbon, which can all intercalate and deintercalate lithium ions. Since graphite among the carbon-based materials has a low discharge potential relative to lithium of +0.2V, a battery using the graphite as a negative active material has a high discharge potential (ranging) at 3.6V or 3.8V or between 3.6V and 3.8V and excellent energy density. Furthermore, the graphite guarantees a long cycle life for a battery due to its outstanding reversibility. However, a graphite active material has low material density (theoretical density of 2.2 g/cc and actual density of 1.1 to 1.7 g/cc) and consequently low capacity in terms of energy density per unit volume when the graphite is used as a negative active material. Further, it has swelling or capacity reduction problems, because the graphite is likely to react with an organic electrolyte during charging and discharging.

In order to solve these problems, oxide negative active materials such as tin oxide, lithium vanadium-based oxide, and the like have been developed. However, oxide negative electrodes do not provide a satisfying battery performance and thus, have been continuously researched.

SUMMARY

One aspect of this disclosure is directed toward a lithium rechargeable battery including a negative active material having improved cycle-life (life cycle) characteristics.

Another aspect of this disclosure is directed toward a method of preparing a negative active material having improved cycle-life characteristics.

According to one embodiment of this disclosure, a rechargeable lithium battery is provided that includes a negative electrode including a silicon-based negative active material; a positive electrode including a positive active material being capable of intercalating and deintercalating lithium; and a non-aqueous electrolyte, wherein the silicon-based negative active material includes a $SiO_x$ (0<x<2) core including Si grains and a continuous or discontinuous coating layer including Ag, the coating layer being disposed on the core.

The silicon-based negative active material may include about 1 wt % to about 50 wt % of Ag based on the entire amount of the silicon-based negative active material.

The coating layer may have a thickness ranging from about 1 nm to about 50 nm.

The coating layer may not be uniform and may maintain an Ag particle shape.

The Si grains may have an average particle diameter of about 1 nm to about 100 nm.

The negative active material may have an average particle diameter ranging from about 1 μm to about 50 μm.

According to another embodiment of the present invention, provided is a method of manufacturing an Ag-coated silicon-based negative active material by dipping a $SiO_x$ (0<x<2) silicon-based material including Si grains in an Ag dispersion solution and drying it to dispose an Ag coating layer thereon.

The method of preparing an Ag-coated silicon-based negative active material in which the drying may include drying at a temperature ranging from about 100° C. to about 200° C. after dipping the silicon-based material in the Ag dispersion solution to form the Ag coating layer.

The Ag coating layer may not be uniform and may maintain an Ag particle shape.

After the Ag coating layer is formed, the Si grains may have an average particle diameter ranging from about 5 nm to about 50 nm.

In view of the foregoing, the negative active material according to one or more embodiments, does not increase the silicon grain size, but includes a conductive layer on the surface, and thus improves the cycle-life characteristic of a rechargeable lithium battery.

DETAILED DESCRIPTION

Exemplary embodiments of the present invention will hereinafter be described in more detail. However, these embodiments are only exemplary, and the present invention is not limited thereto.

The rechargeable lithium battery according to one embodiment of the present invention includes a negative electrode including a silicon-based negative active material; a positive electrode including a positive active material being capable of intercalating and deintercalating lithium; and a non-aqueous electrolyte.

Rechargeable lithium batteries may be classified as lithium ion batteries, lithium ion polymer batteries, and lithium polymer batteries according to the presence of a separator and the kind of electrolyte used in the battery. The rechargeable lithium batteries may have a variety of suitable shapes and sizes and thus, may include cylindrical, prismatic, or coin-type batteries and may be thin film batteries or be rather bulky in size. Structures and fabricating methods for lithium ion batteries can be any suitable structures and fabricating methods.

Figure 2:
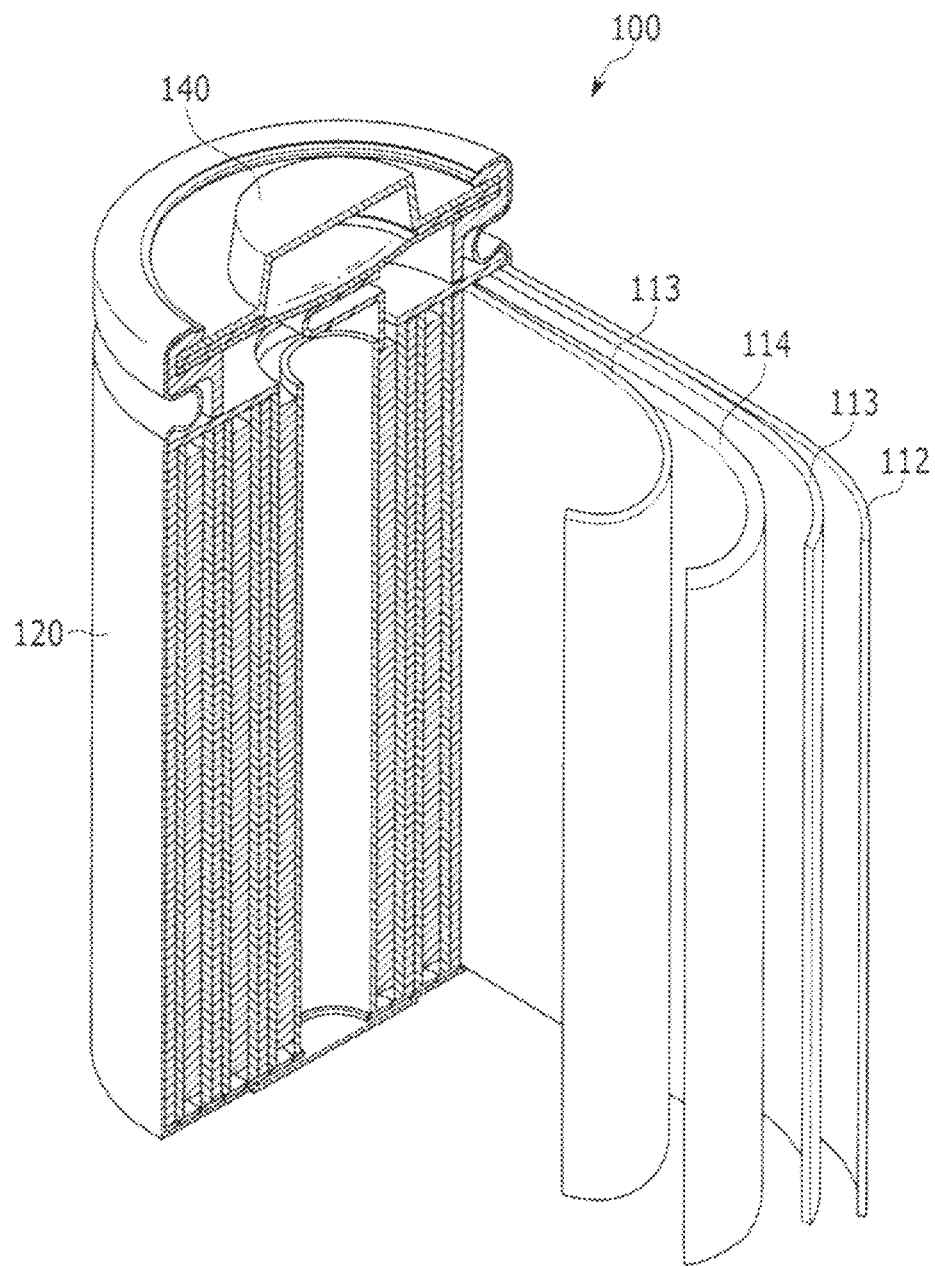
FIG. 2 is a schematic view illustrating a rechargeable lithium battery according to one embodiment.

FIG. 2 is the exploded perspective view of a rechargeable lithium battery according to one embodiment. Referring to FIG. 2, the rechargeable lithium battery 100 is a cylindrical battery including a negative electrode 112, a positive electrode 114, a separator 113 interposed between the negative electrode 112 and the positive electrode 114, an electrolyte impregnating the separator 113, a battery case 120, and a sealing member 140 sealing the battery case 120. The negative electrode 112, positive electrode 114, and separator 113 are sequentially stacked, spirally wound, and placed in a battery case 120 to fabricate the rechargeable lithium battery 100.

In one embodiment, the negative electrode 112 includes a current collector and a negative active material layer formed on the current collector. The negative active material layer includes a silicon-based negative active material.

Figure 1A:
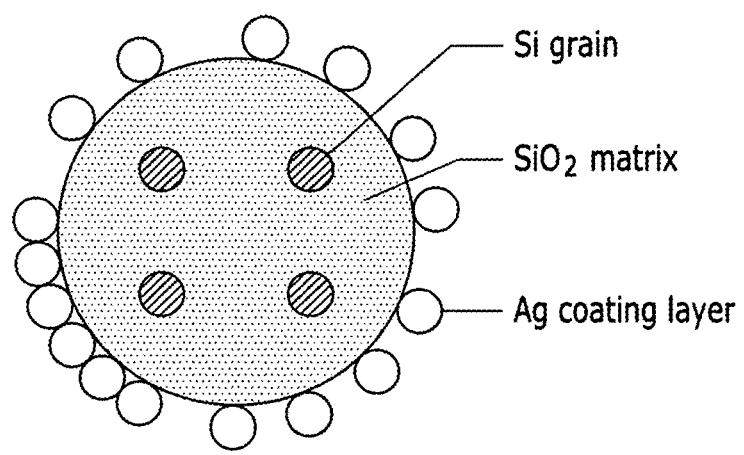
FIGS. 1A and 1B are schematic views illustrating silicon-based negative active materials.

In one embodiment and referring to FIG. 1A, the silicon-based negative active material includes a $SiO_x$ (0<x<2) core including Si grains and a continuous or discontinuous coating layer including Ag. Here, the coating layer is disposed on the core. Specifically, the core may include nano Si grains dispersed in a silica $SiO_2$ matrix.

The negative active material may have improved conductivity since it further includes Ag, an electro/conductive material, in a $SiO_x$ (0<x<2) core. In addition, since the Ag coating layer is formed in a method requiring no high temperature, Si grains in the core may be prevented from growth.

According to another embodiment of the present invention, the Si grains may have an average particle diameter (ranging) at 1 nm or 100 nm or between 1 nm and 100 nm. In particular, the Si grains may have an average particle diameter (ranging) at 5 nm or 50 nm or between 5 nm and 50 nm. In more particular, the Si grains may have an average particle diameter (ranging) at 5 nm or 30 nm or between 5 nm and 30 nm. The Si grain size is measured through its XRD using CuKα in a Debye-Scherrer method or through TEM analysis. In one embodiment, when used as a negative active material including Si grains with a particle diameter within the range, it further improves cycle-life (life-cycle) characteristic of a rechargeable lithium battery.

The Ag coating layer may be continuously disposed on the surface of a $SiO_x$ core including Si grains or discontinuously on the partial surface thereof. For example, the coating layer may not be uniform and maintains one or more Ag particle shapes.

The silicon-based negative active material may include Ag in an amount (ranging) at 1 wt % or 50 wt % or between 1 wt % and 50 wt % in a coating layer based on the entire amount thereof. In one embodiment, when Ag is included within the range, it forms a large conductive network in a rechargeable lithium battery including the negative active material and maintain a conductive path among active materials with relatively low conductivity, resultantly improving electric conductivity of the rechargeable lithium battery and thus, its cycle-life characteristic.

The Ag coating layer may have a thickness (ranging) at 1 nm or 50 nm or between 1 nm and 50 nm. In one embodiment, when the coating layer is extremely thin, it does not have a sufficient conductive path. In another embodiment, when it is extremely thick, it can deteriorate battery capacity. Accordingly, when the coating layer has a thickness within the above range, it may improve electric conductivity of a rechargeable lithium battery including the negative active material.

The negative active material may have an average particle diameter (ranging) at 1 μm or 50 μm or between 1 μm and 50 μm. In one embodiment, when a negative active material has a size within the range, the processability is good and side reactions are less incurred.

According to still another embodiment of the present invention, provided is a method of preparing an Ag-coated silicon-based negative active material which includes dipping a $SiO_x$ (0<x<2) silicon-based material including Si grains in an Ag dispersion solution and drying it to form an Ag coating layer thereon.

The coating may have no particular limit but include either dry or liquid coating. The dry coating may include deposition, a CVD (chemical vapor deposition), or the like. The liquid coating may include impregnation, spraying, plating, or the like.

The drying may be performed at a temperature (ranging) at 100° C. or 200° C. or between 100° C. and 200° C. to prepare an Ag-coated silicon-based negative active material. In one embodiment, since the coating is performed at a low temperature as aforementioned, Si grains are prevented from growth. Thus, a Si grain size in the core of a final negative active material may be controlled.

Accordingly, since the negative active material may not increase a silicon (Si) grain size by including an Ag coating conductive layer on its surface, it may improve cycle-life characteristic of a rechargeable lithium battery. For example and referring to FIG. 1B, when carbon instead of Ag is used to form a carbon coating layer, the coating should performed at about 1000° C. to decompose methane ($CH_4$), growing Si grains in the core and resultantly, degrading cycle-life of a battery. In general, there is an inversely proportional relationship between Si grains size and cycle-life (life-cycle).

The manufacturing method may provide an Ag-coated silicon-based negative active material including Si grains with an average particle diameter (ranging) at 5 nm or 50 nm or between 5 nm and 50 nm.

The negative active material layer also includes a binder and optionally a conductive material.

The binder improves binding properties of the positive active material particles to one another and also, with a current collector. Examples of the binder include polyvinylalcohol, carboxylmethyl cellulose, hydroxypropyl cellulose, polyvinyl chloride, carboxylated polyvinyl chloride, polyvinylfluoride, a polymer including ethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but are not limited thereto.

The conductive material is included to improve electrode conductivity. Any electrically conductive material may be used as a conductive material unless it causes a chemical change. Examples of the conductive material include carbon-based materials such as natural graphite, artificial graphite, carbon black, acetylene black, ketjen black, carbon fiber, and the like; a metal-based material such as a metal powder or a metal fiber including copper, nickel, aluminum, silver, or the like; a conductive polymer such as polyphenylene derivative, or the like; or mixtures thereof.

The current collector may be selected from the group consisting of copper films, nickel films, stainless steel films, titanium films, nickel foams, copper foams, polymer substrate(s) coated with conductive metal(s), and combinations thereof.

The positive electrode may include a current collector and a positive active material layer disposed on the current collector.

The positive active material includes lithiated intercalation compounds that reversibly intercalate and deintercalate lithium ions. The positive active material may include a composite oxide including lithium and at least one selected from the group consisting of cobalt, manganese, and nickel. In particular, the following lithium-containing compounds may be used:

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.05, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMnG_bO_2$ (0.90≤a≤1.8, 0.001≤b≤0.1); $Li_aMn_2G_bO_4$ (0.90≤a≤1.8, 0.001≤b≤0.1); $Li_aMnG_bPO_4$ (0.90≤a≤1.8, 0.001≤b≤0.1); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); and/or $LiFePO_4$.

In the above formulas, A is selected from the group consisting of Ni, Co, Mn, and combinations thereof; R is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn, and combinations thereof; Z is selected from the group consisting of F, S, P, and combinations thereof; G is selected from the group consisting of Al, Cr, Mn, Fe, Mg, La, Ce, Sr, V, and combinations thereof; Q is selected from the group consisting of Ti, Mo, Mn, and combinations thereof; T is selected from the group consisting of Cr, V, Fe, Sc, Y, and combinations thereof; and J is selected from the group consisting of V, Cr, Mn, Co, Ni, Cu, and combinations thereof.

The compound may have a coating layer on the surface or may be mixed with another compound having a coating layer. The coating layer is made of a coating element compound and may include an oxide of a coating element, a hydroxide of a coating element, an oxyhydroxide of a coating element, an oxycarbonate of a coating element, and a hydroxylcarbonate of a coating element. The compound for a coating layer may be amorphous or crystalline. The coating element for a coating layer may include Mg, Al, Co, K, Na, Ca, Si, Ti, V, Sn, Ge, Ga, B, As, Zr, or a mixture thereof. The coating layer may be formed in a method having no adverse influence on properties of a positive active material by including these elements in the compound. For example, the method may include any suitable coating method such as spraying, dipping, or the like.

The positive active material layer also includes a binder and a conductive material.

The binder improves binding properties of the positive active material particles to one another and also, with a current collector. Examples of the binder include at least one selected from the group consisting of polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but are not limited thereto.

The conductive material is included to improve electrode conductivity. Any electrically conductive material may be used as a conductive material unless it causes a chemical change. Examples of the conductive material include one or more of carbon black, acetylene black, ketjen black, carbon fiber, a metal powder or a metal fiber including copper, nickel, aluminum, silver, and/or polyphenylene derivatives.

The current collector may be Al but is not limited thereto.

The negative and positive electrodes may be fabricated by mixing the active material, a conductive material, and a binder into an active material composition and coating the composition on a current collector. The electrode manufacturing method is any suitable electrode manufacturing method. The solvent may be N-methylpyrrolidone, but it is not limited thereto.

The electrolyte may include non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, and/or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, or the like. Examples of the ether-based solvent include dibutyl ether, tetraglyme, diglyme, dimethoxyethane, 2-methyltetrahydrofuran, tetrahydrofuran, or the like. Examples of the ketone-based solvent include cyclohexanone or the like. Examples of the alcohol-based solvent include ethyl alcohol, isopropyl alcohol, or the like. Examples of the aprotic solvent include nitriles such as R—CN (wherein R is a C2 to C20 linear, branched, or cyclic hydrocarbon, a double bond, an aromatic ring, or an ether bond), amides such as dimethylformamide, dioxolanes such as 1,3-dioxolane, sulfolanes, or the like.

The non-aqueous organic solvent may be used singularly or in a mixture. When the organic solvent is used in a mixture, the mixture ratio can be controlled in accordance with a desirable battery performance.

The carbonate-based solvent may include the mixture of a cyclic carbonate and a linear carbonate. The cyclic carbonate and the chain carbonate are mixed together in the volume ratio at 1:1 or 1:9 or between 1:1 and 1:9. In one embodiment, when the mixture is used as an electrolyte, the electrolyte performance is enhanced.

In addition, the electrolyte may further include mixtures of a carbonate-based solvent and an aromatic hydrocarbon-based solvent. The carbonate-based solvent and the aromatic hydrocarbon-based organic solvent may be mixed together in the volume ratio at 1:1 or 30:1 or between 1:1 and 30:1.

The aromatic hydrocarbon-based organic solvent may be represented by the following Chemical Formula 1.

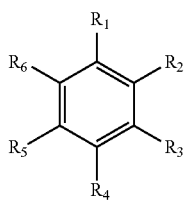

Chemical Formula 1

In Chemical Formula 1, $R_1$ to $R_6$ are independently hydrogen, a halogen, a C1 to C10 alkyl group, a C1 to C10 haloalkyl group, or a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The non-aqueous electrolyte may further include vinylene carbonate or an ethylene carbonate-based compound of the following Chemical Formula 2.

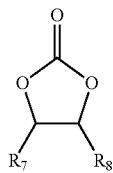

Chemical Formula 2

In Chemical Formula 2, $R_7$ and $R_8$ are independently hydrogen, a halogen, a cyano (CN), a nitro ($NO_2$), and a C1 to C5 fluoroalkyl, provided that at least either of $R_7$ pr $R_8$ is a halogen, a nitro ($NO_2$), or a C1 to C5 fluoroalkyl. Thus, the $R_7$ and $R_8$ are not both (simultaneously) hydrogen.

In Chemical Formula 2, $R_7$ and $R_8$ are independently hydrogen, a halogen, a cyano (CN), a nitro ($NO_2$), or a C1 to C5 fluoroalkyl, provided that at least either of $R_7$ or $R_8$ is a halogen, a nitro ($NO_2$), or a C1 to C5 fluoroalkyl. Herein, the $R_7$ and $R_8$ are not both (simultaneously) hydrogen. The use amount of the vinylene carbonate or the ethylene carbonate-based compound as an additive for improving cycle-life may be adjusted within an appropriate range.

The lithium salt supplies lithium ions in the battery, operates a basic operation of a rechargeable lithium battery, and improves lithium ion transportation between positive and negative electrodes. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bisoxalato borate; LiBOB). The lithium salt may be used (ranging) at 0.1 or 2.0M or between 0.1 and 2.0M concentration. In one embodiment, when the lithium salt is included at the above concentration range, electrolyte performance and lithium ion mobility are enhanced due to improved electrolyte conductivity and viscosity.

The rechargeable lithium battery may further include a separator between a negative electrode and a positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, or a polypropylene/polyethylene/polypropylene triple-layered separator.

The following examples illustrate the present invention in more detail. These examples, however, are not in any sense to be interpreted as limiting the scope of this invention.

EXAMPLE

Preparation Examples 1 to 3

Preparation of Negative Active Material

A silicon-based negative active material coated with Ag was prepared by dispersing a SiO material in a nano Ag dispersion solution as follows.

Figure 3:
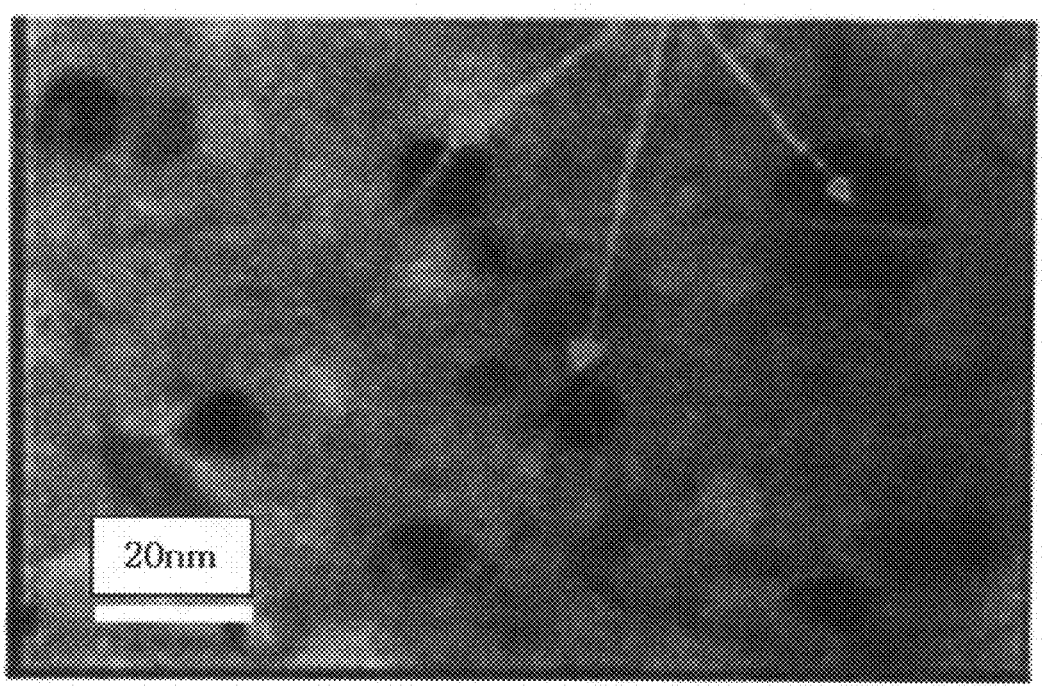
FIG. 3 is a TEM photograph of a SiO material used for preparing negative active materials according to Examples and Comparative Examples.

1. The SiO material is made by Japanese Shinetsu silicon, in which nano Si grains are dispersed in a silica $SiO_2$ matrix. The SiO material has an atomic ratio of $Si:SiO_2=1:1$ and thus, represented as SiO. It may be represented by a $SiO_x$ material with x=1. FIG. 3 provides the TEM photograph of the SiO material, in which Si is dispersed in a silica matrix. The Si has a size (ranging) at 10 nm or 20 nm or between 10 nm and 20 nm.

The Ag dispersion solution was prepared by dispersing nano Ag powder in ethanol. Specifically, about 10 g of Ag nanopowder was mixed with about 190 g of ethanol, and dispersed using an ultrasonic wave dispersing device to the Ag dispersion solution.

2. About 90 g of the SiO material was put in the Ag dispersion solution. The resulting product was maintained at about 50° C. and stirred with a magnetic bar. As the ethanol solvent therein was slowly evaporated, Ag was coated on the material, preparing a SiO active material coated with about 10 wt % of Ag. A weight ratio is provided in the following Table 1.

3. The coated powder was collected and then dried at about 120° C. for enough time to remove moisture and the solvent.

4. The Ag was included in a different weight of about 10%, 20%, and 50% to thereby prepare each specimen (Preparation Examples 1 to 3).

Since the specimens according to Preparation Examples 1 to 3 were heat-treated at a highest temperature of about 120° C., the SiO active materials invariably maintained a Si grain size (ranging) at 10 nm or 20 nm or between 10 nm and 20 nm.

TABLE 1

| Sample | Preparation Example 1 | Preparation Example 2 | Preparation Example 3 |
|---|---|---|---|
| Amount of Ag | 10% | 20% | 50% |
| Amount of SiO active material | 90% | 80% | 50% |
| Actual amount of Ag (wt %, EDS analysis) | 9.99% | 18.34% | 46.31% |

Figure 4A:
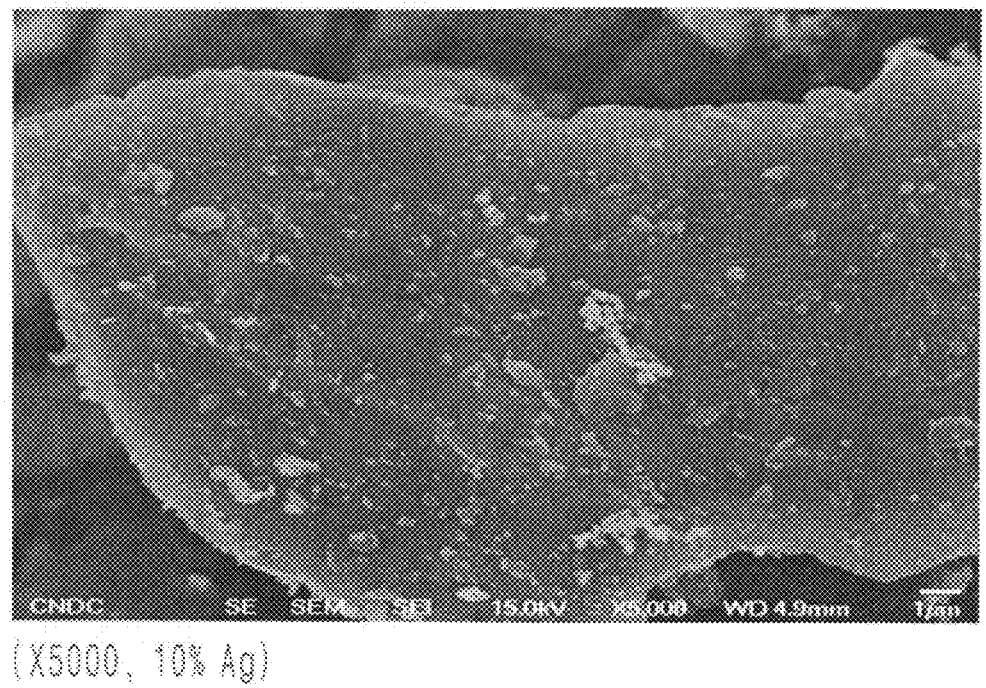
FIGS. 4A, 4B, and 4C are the SEM photograph of silicon-based negative active materials according to Preparation Examples of negative active materials.
Figure 4B:
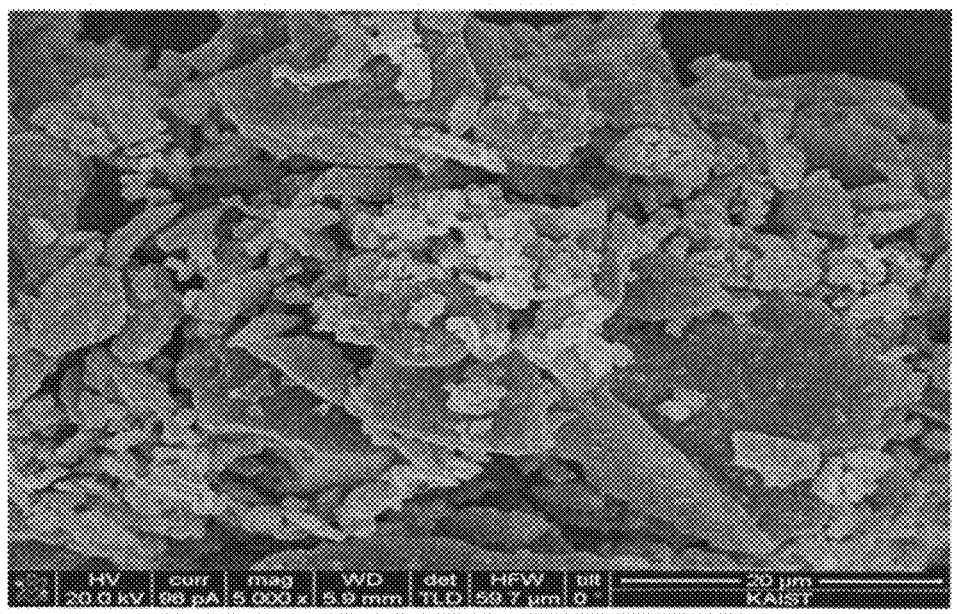
Figure 4C:
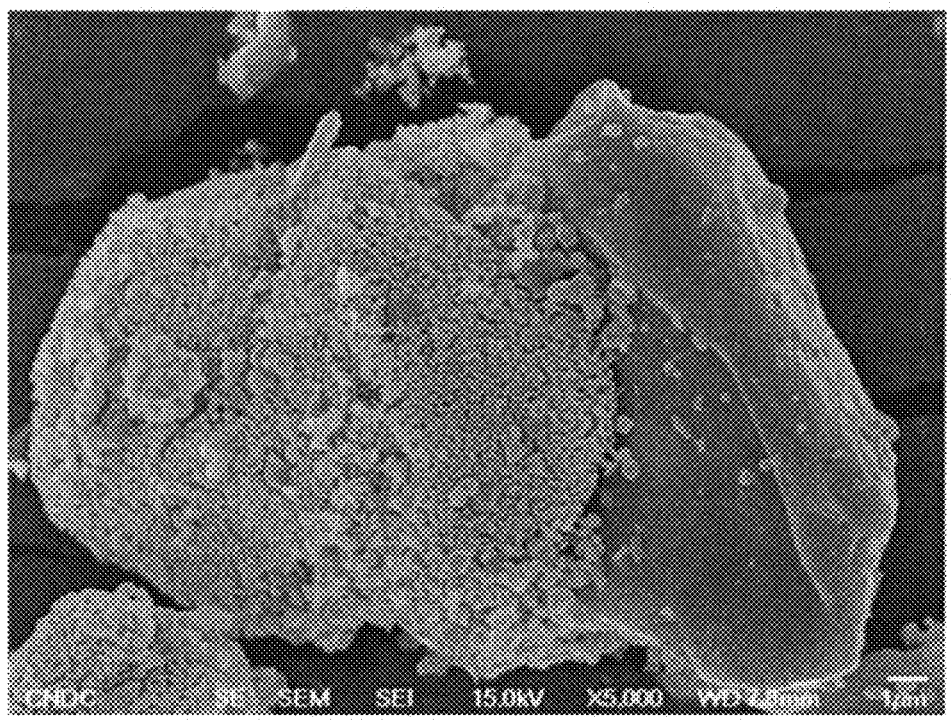
Figure 5:
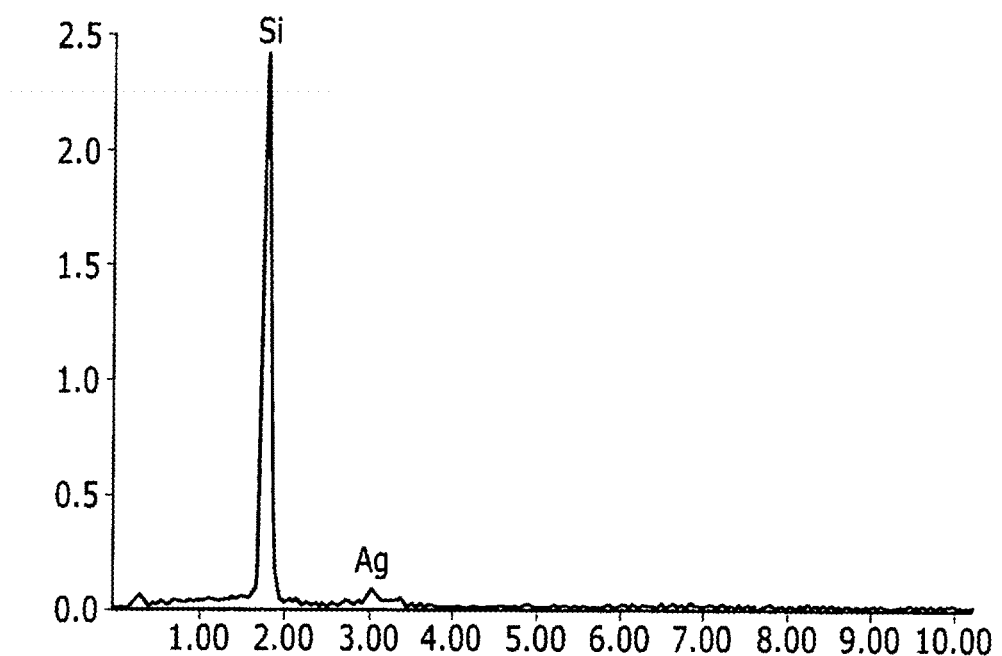
FIG. 5 is a graph showing energy dispersive spectroscopy (EDS) analysis results of a silicon-based negative active material according to a Preparation Example.

FIGS. 4A, 4B, and 4C provide the SEM photographs of the negative active materials prepared according to Preparation Examples 1 to 3, respectively. FIG. 5 provides the EDS component analysis graph of the negative active material according to Preparation Example 1. The coating amount of Ag in each negative active material was calculated. Table 1 provides the results. When the Ag was included in an amount of about 10%, about the same amount was actually coated. However, when the Ag was in an amount of about 20% and about 50%, not all of the Ag amount was coated. The rest of the Ag was presumed to be lost during the process.

Preparation Example 4

Preparation of Carbon-Coated Negative Active Material

Figure 1B:
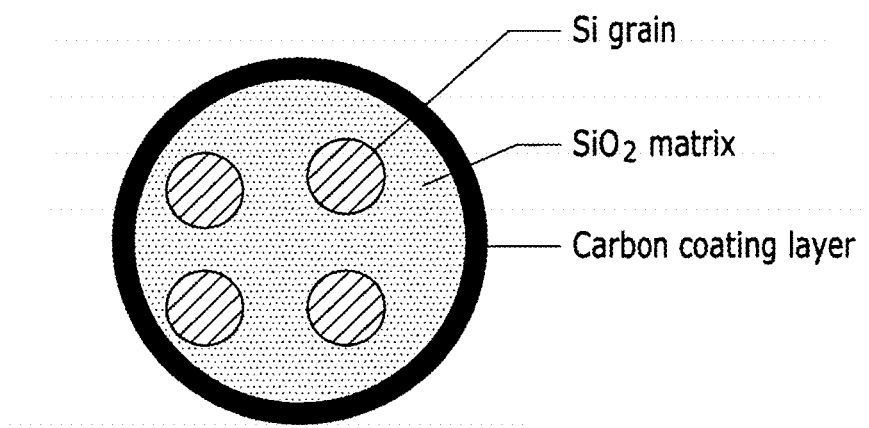

A negative active material was prepared to have a 1 μm-thick carbon coating layer as, e.g., shown in FIG. 1B instead of an Ag coating layer as, e.g., shown in FIG. 1A. It was prepared in a CVD method. About 10 g of SiO powder were put in a 3 inch spinnable circular quartz tube furnace and heated up to about 1000° C. While the reactant was maintained at about 1000° C., methane gas ($CH_4$) was flown in at a speed of about 20 sccm (standard cubic centimeters per minute) for one hour to uniformly coat about 1 um-thick carbon on the SiO powder. The quartz tube was specially fabricated to prevent the powder from being spilled out during the spinning. The tube was spun to uniformly coat a carbon layer.

In Preparation Example 4, since the heat treatment was performed at a high (e.g., maximum) temperature of about 1000° C., the SiO active material was expected to have an increased Si grain size. Its TEM shows that the Si grains had an increased size (ranging) at 30 nm or 50 nm or between 30 nm and 50 nm.

Figure 6:
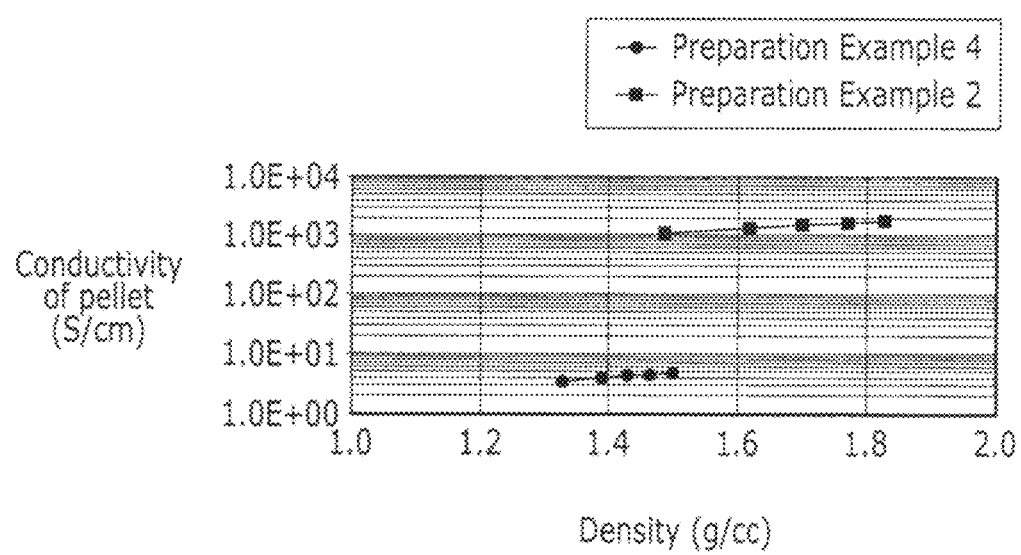
FIG. 6 provides conductivity data of silicon-based negative active material pellets according to Preparation Examples.

FIG. 6 provides the conductivity data of pellets prepared by using the negative active materials of Preparation Examples 2 and 4, which shows that the Ag-coated active material according to Preparation Example 2 had about 100 times higher conductivity than the carbon-coated active material according to Preparation Example 4.

Examples 1 to 3

Fabrication of Rechargeable Lithium Battery Cells

An 18650 circular cell was fabricated by using the negative active materials according to Preparation Examples 1 to 3. A negative electrode was prepared by using an active material composition having a weight ratio among an active material:a conductive material:a binder=80:10:10 in a solvent. The conductive material was Denka black, the binder was PI (polyimide), and the solvent was NMP (N-methyl-2-pyrrolidone). As for a positive electrode, $LiCoO_2$ was used. As shown in FIG. 2, a separator was inserted between the negative electrode and the positive electrode. The resulting product was spiral-wound and housed in a can. Then, an electrolyte solution was implanted in the can, and the can was sealed to fabricate a cell (battery cell). The electrolyte solution was prepared by dissolving 1.5M $LiPF_6$ in a mixed solvent of EC (ethylenecarbonate), EMC (ethylmethylcarbonate) and DMC (dimethylcarbonate) (3:3:4 volume ratio) and adding FEC (Fluorinated ethyl carbonate) to the resulting material. The added volume of the FEC was 5 parts by volume based on 100 parts by volume of the mixed solvent.

Comparative Example 1

Fabrication of Rechargeable Lithium Battery Cell

A rechargeable lithium battery cell was fabricated according to substantially the same method as Example 1 except for using the negative active material according to Preparation Example 4.

Figure 7:
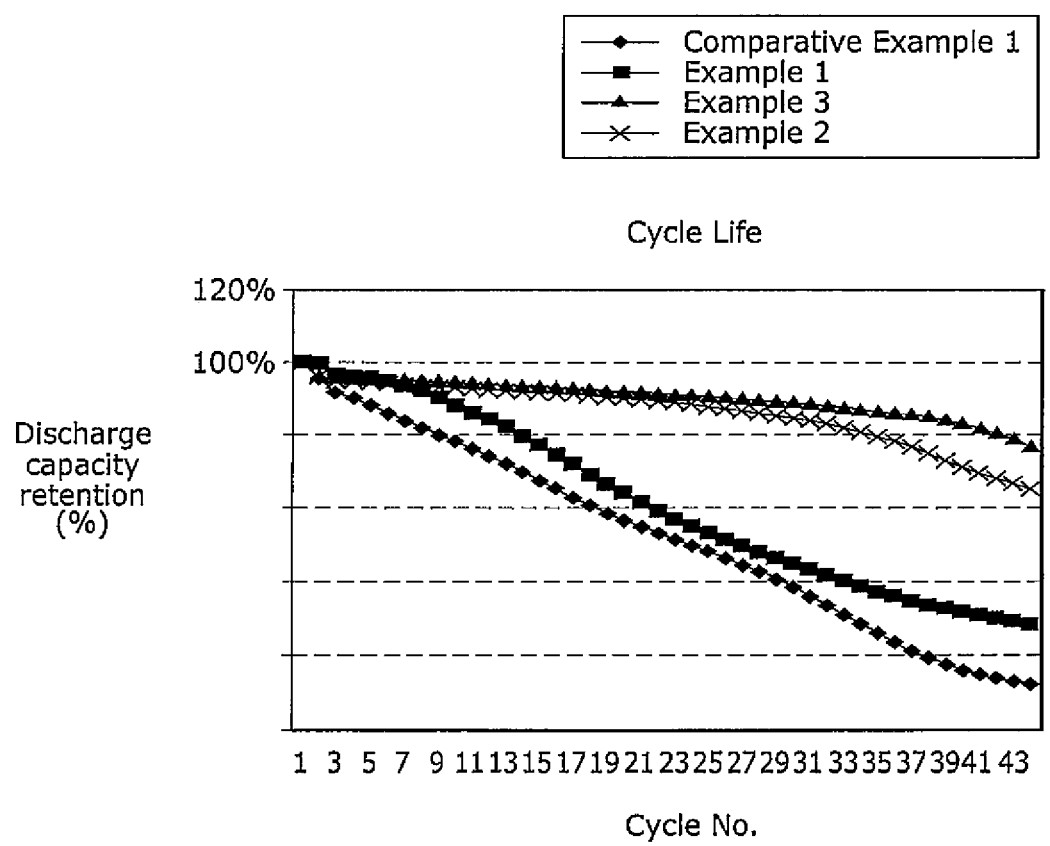
FIG. 7 is a graph showing cycle-life (life-cycle) characteristic of the cells according to Examples 1 to 3 of the present invention.

FIG. 7 provides a graph showing the cycle-life characteristic of the cells according to Examples 1 to 3 and Comparative Example 1. The cell including a negative active material coated with Ag in an amount (ranging) at 10 wt % or 50 wt % or between 10 wt % and 50 wt % turned out to have excellent cycle-life characteristic compared with the one of Comparative Example.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A rechargeable lithium battery, comprising:
a negative electrode comprising a silicon-based negative active material;
a positive electrode comprising a positive active material for intercalating and deintercalating lithium; and
a non-aqueous electrolyte,
wherein the silicon-based negative active material has a conductivity of greater than or equal to $1.0 \times 10^3$ S/cm,
wherein the silicon-based negative active material comprises a $SiO_x$ (0<x<2) core comprising Si grains at an interior of the core and a continuous or discontinuous coating layer on the surface of the core, the coating layer comprising Ag having a thickness at 1 nm or 50 nm or between 1 nm and 50 nm,
wherein the silicon-based negative active material comprises at 20 wt % or 50 wt % or between 20 wt % and 50 wt % of Ag based on the entire amount of the silicon-based negative active material, and
wherein the Si grains have an average particle diameter at 1 nm or 100 nm or between 1 nm and 100 nm.
2. The rechargeable lithium battery of claim 1, wherein the coating layer is not uniform and maintains an Ag particle shape.
3. The rechargeable lithium battery of claim 1, wherein the negative active material has an average particle diameter at 1 μm or 50 μm or between 1 μm and 50 μm.
4. A method of manufacturing a negative active material, the method comprising:
dipping an $SiO_x$ (0<x<2) silicon-based material having Si grains in an Ag dispersion solution to form a resultant product; and
drying the resultant product to form an Ag coating layer having a thickness at 1 nm or 50 nm or between 1 nm and 50 nm,
wherein the resultant product has a conductivity of greater than or equal to $1.0 \times 10^3$ S/cm,
wherein the Si grains have an average particle diameter at 5 nm or 50 nm or between 5 nm and 50 nm and are at an interior of a core of the $SiO_x$ silicon-based material after the Ag coating layer is formed, and
wherein the resultant product comprises at 20 wt % or 50 wt % or between 20 wt % and 50 wt % of Ag based on the entire amount of the resultant product.

5. The method of claim 4, wherein the drying is performed at a temperature at 100° C. or 200° C. or between 100° C. and 200° C.

6. The method of claim 4, wherein the Ag coating layer is not uniform and maintains an Ag particle shape.

7. A rechargeable lithium battery, comprising a negative electrode comprising a silicon-based negative active material, the silicon-based negative active material having a conductivity of greater than or equal to $1.0 \times 10^3$ S/cm and comprising a $SiO_x$ (0<x<2) core and an Ag continuous or discontinuous coating layer on the core, wherein the core comprises Si grains having an average particle diameter at 1 nm or 100 nm or between 1 nm and 100 nm at an interior of the core, the silicon-based negative active material comprises at 20 wt % or 50 wt % or between 20 wt % and 50 wt % of Ag based on the entire amount of the silicon-based negative active material, and the coating layer has a thickness at 1 nm or 50 nm or between 1 nm and 50 nm;

a positive electrode comprising a positive active material; and a non-aqueous electrolyte between the negative electrode and the positive electrode.

8. The rechargeable lithium battery of claim 7, wherein the coating layer is not uniform and maintains an Ag particle shape.

9. The rechargeable lithium battery of claim 7, wherein the negative active material has an average particle diameter at 1 μm or 50 μm or between 1 μm and 50 μm.

10. The rechargeable lithium battery of claim 1, wherein the silicon-based negative active material has a conductivity of $1.0 \times 10^3$ S/cm to $2.0 \times 10^3$ S/cm.

11. The method of claim 4, wherein the resultant product has a conductivity of $1.0 \times 10^3$ S/cm to $2.0 \times 10^3$ S/cm.

12. The rechargeable lithium battery of claim 7, wherein the silicon-based negative active material has a conductivity of $1.0 \times 10^3$ S/cm to $2.0 \times 10^3$ S/cm.

* * * * *